United States Patent [19]

Barkhurst

[11] Patent Number: 5,353,317
[45] Date of Patent: Oct. 4, 1994

[54] SHIPPING SHIM FOR NUCLEAR REACTOR FUEL ASSEMBLIES

[75] Inventor: David J. Barkhurst, Pasco, Wash.

[73] Assignee: Siemens Power Corporation, Richland, Wash.

[21] Appl. No.: 168,108

[22] Filed: Dec. 15, 1993

[51] Int. Cl.$^5$ .............................................. G21C 19/06
[52] U.S. Cl. .................................. 376/261; 376/272; 376/446; 410/42
[58] Field of Search ................ 376/261, 272, 285, 446; 206/585, 593; 410/42

[56] References Cited

U.S. PATENT DOCUMENTS

| | | | |
|---|---|---|---|
| 3,900,116 | 8/1975 | Gehri | 376/261 |
| 5,198,183 | 3/1993 | Newman | 376/272 |
| 5,263,063 | 11/1993 | Sappey | 376/261 |
| 5,263,064 | 11/1993 | Sappey | 376/261 |

FOREIGN PATENT DOCUMENTS 54-38485  3/1979  Japan ................................ 376/272

Primary Examiner—Daniel D. Wasil
Attorney, Agent, or Firm—Ira Lee Zebrak

[57] ABSTRACT

A shipping shim (30) for restraining nuclear fuel rods (11, 12, 13) in a nuclear fuel assembly (10) which accommodates varied sized gaps ($g_1, g_2, g_3, g_4$) between fueled and non-fuel bearing members in the fuel assembly.

10 Claims, 3 Drawing Sheets

SHIPPING SHIM FOR NUCLEAR REACTOR FUEL ASSEMBLIES

FIELD OF THE INVENTION

The invention relates generally to shipping shims, and more particularly to shipping shims for use in the shipment of nuclear fuel assemblies or of other articles containing substantially parallel arrays of rods which require restraint from moving during such shipment.

BACKGROUND OF THE INVENTION

New fuel assemblies for light water reactors are shipped from the fabrication plant to their destination in a generally horizontal position in special containers. Some fuel assembly designs require protection against shipping related fretting damage to the fuel rods caused by the fuel rods moving within spacer grids which are used to provide lateral bracing and spacing, and which maintain the fuel rods in fixed positions during reactor operations. Since even the slightest repeated relative movement between contacted fuel rods and spacers can result in fretting of the fuel cladding, minimization of such relative movement is desired during fuel shipment as well as during reactor operations.

In a nuclear reactor, the reactor core contains nuclear fuel which is typically in the form of fuel rods grouped together in fuel assemblies. Groups of fuel assemblies are arranged into a matrix to form a core capable of controlled fission reaction. Each fuel rod is typically a long member approximately 0.4 inches in diameter and 8-15 feet long containing fuel usually in the form of a stack of fuel pellets which are surrounded by tubular cladding. The fuel rods which make up an assembly are grouped together to form a plurality of longitudinally extending members which are supported vertically by two parallel end plates, an upper and a lower tie plate. These plates are usually connected to one another by tie rods or other structural elements.

A fuel assembly or bundle may also include other non-fuel bearing members. Examples include guide tubes in pressurized water reactors to form passageways for control rods which assist in controlling the rate of fission, instrumentation tubes for in-core instrumentation, spacer capture rods, and water rods or water channels which modify the neutron moderation in the assembly by permitting coolant moderator to flow from the lower tie plate through or into the upper part of the fuel assembly and out of the upper tie plate. The spaces between adjacent fuel rods and between fuel rods and non-fuel bearing members create flow channels through which coolant and/or moderator can circulate.

The fuel assembly, whether in a pressurized water reactor, boiling water reactor, high temperature gas cooled reactor, or any other type of reactor, functions in part to maintain the fuel rods in a fixed position, ideally free of vibration and restrained from bowing or other movement during normal and other reactor operating conditions. Spacers or spacer grids which provide rod-to-rod spacing and lateral bracing are typically designed to allow differential axial expansion of the fuel rods. Spacers and spacer components are therefore generally not rigidly connected to the fuel rods. Spacers are comprised of spacer cells each of which includes a combination of fixed contact points and/or resilient springs to maintain the desired rod-to-rod spacing and to maintain the fuel rods in their proper lateral positions. The springs and dimples which necessarily contact the fuel cladding also permit some radial movement of the fuel rod which can therefore cause fretting.

The springs in the spacers or spacer grids are designed to meet a number of design criteria which effect the maximum forces they may exert on the fuel rod at the beginning of service life. Maximum loads are dictated by considerations such as local stresses in the cladding tube and damage to fuel rods during insertion into the fuel assembly. It is not always practical, however, to satisfy service requirements, while at the same time accommodating very different types and kinds of loads that are incurred during shipment of the fuel assembly. Typically, loads resulting from the shipment of fuel assemblies include multi-directional acceleration of the fuel rods.

Some fuel assemblies have fuel rods and non-fuel bearing members arrayed such that the gap or distance between each of the fuel rods or members is constant. One way to protect such fuel assemblies during shipment is to insert shims between all of the fuel rods during packaging. These shims generally have a single thickness which corresponds to the nominal gap between the rows of fuel rods or members.

However, some fuel assembly designs do not necessarily have the same distance between fuel rods and/or between fuel rods and non-fuel bearing members of the fuel assembly. Such fuel assemblies may have: fuel rods of different outside diameters; fuel rods in rectangular, triangular or hexagonal arrays; variable fuel rod to fuel rod distances; variable fuel rod to inner water channel distances; and/or variable fuel rod to water tubes or water rod distances. In addition, the distance between fuel rods or fuel rods and other non-fuel bearing members at one elevation in the fuel assembly can vary from that at a different elevation due to axial variation of the fuel rod diameter. Furthermore, the use of part length fuel rods also affects the distance between fuel rods at different elevations within the fuel assembly.

Although the inclusion of one or more of such design features in the fuel assembly optimize one or more performance features of the fuel design, the protection of the fuel rods against fretting during shipment becomes particularly complex, if not infeasible, as well as costly and time consuming.

It would thus be an advantage over prior art designs to provide a shipping shim which can accommodate multiple variable sized gaps between fuel rods and/or between fuel rods and non-fuel bearing components of a nuclear fuel assembly.

SUMMARY OF THE INVENTION

A shipping shim for restraining substantially parallel nuclear fuel rods in a nuclear fuel assembly having non-fuel bearing members as well as nuclear fuel rods, the shipping shim comprising a main fork having a plurality of flexible and substantially parallel tines for insertion between ones of said nuclear fuel rods and non-fuel bearing members in the nuclear fuel assembly, the plurality of tines extending from a base, at least one of the tines being adapted to have a hollow portion which hollow portion extends into the base and a locking fork having at least one rib for insertion into the at least one hollow tine, the at least one rib extending from a web and being adapted to fit into the hollow portion of the base and into the at least one of the plurality of tines of the main fork, so that when the at least one rib is inserted into the at least one hollow tine, the at least one hollow tine becomes substantially rigid restraining at least one of said nuclear fuel rods and non-fuel bearing members.

DETAILED DESCRIPTION OF THE INVENTION

The present invention is directed to fuel assemblies which meet both of the following conditions. First, the fuel assembly spacer grid cannot prevent the movement of fuel rods relative to the spacer grid. This relative movement, caused by gravitational forces acting on the horizontal fuel rods, can result in fretting damage to the rods and/or spacer grids. Second, the gaps between the outside surface of fuel rods and/or between fuel rods and non-fueled components of the assembly are not uniform, and moreover do not permit the insertion of a simple one-piece shipping shim which would fill all of those gaps.

Figure 1:
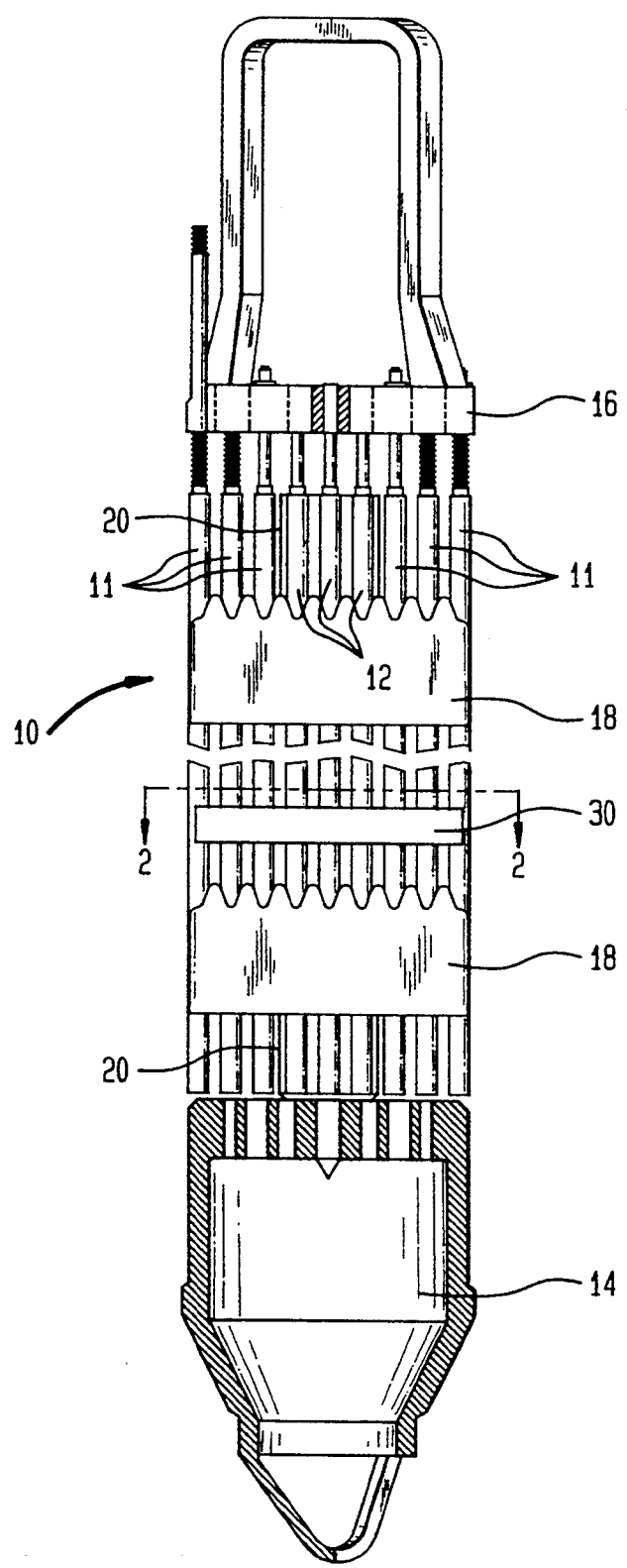
FIG. 1 depicts in side view, a boiling water reactor fuel assembly with a shipping shim positioned in the assembly and with the outer channel removed.

Referring to FIG. 1, a boiling water reactor fuel assembly is generally shown at 10 having elongated fuel rods 11, 12, 13 although only fuel rods 11, 12 can be seen in this view. Fuel rods 11, 12 and 13 differ from each other in that they have a different outside diameter. Although not drawn to scale, the differences in fuel rod diameter are used for purposes of illustration. Similarly, the array of fuel rods depicted in FIG. 1 is a 9×9 arrangement which has been chosen for purposes of illustration and discussion. The fuel rods are supported between a lower tie plate 14 and upper tie plate 16. Fuel rods 11, 12, 13 pass through several spacer grids 18, only two of which are shown in this fragmentary view. Spacer grids 18 provide intermediate support of fuel rods 11, 12, 13 over the length of the fuel assembly and maintain them in spaced relationship while restraining them from lateral vibration. The fuel assembly shown in FIG. 1 includes a central rectangular water channel 20 positioned at the center of the array of fuel rods.

Figure 2:
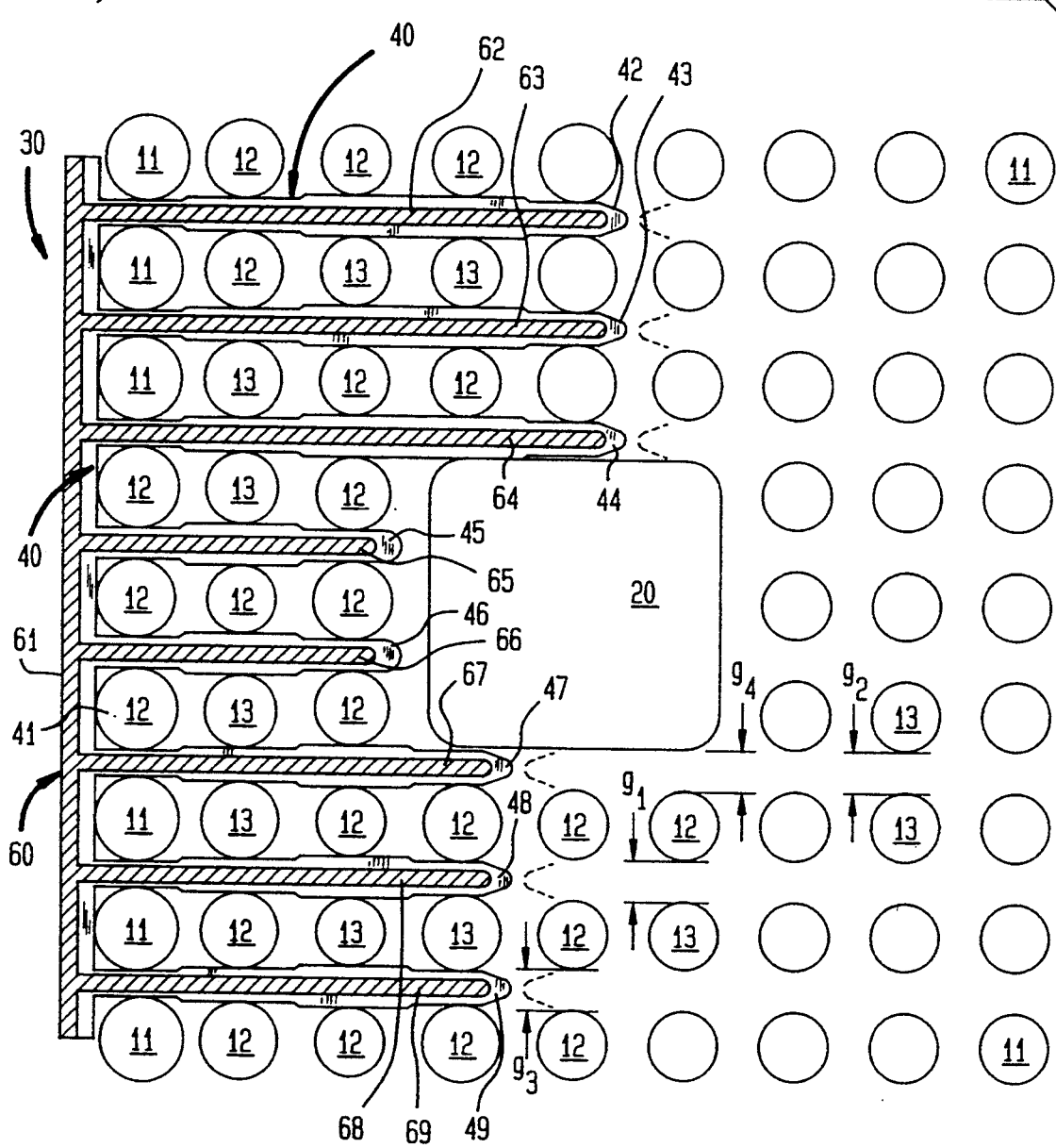
FIG. 2 is a cross-sectional view of the fuel assembly shown in FIG. 1 taken at lines 2—2 and showing the shipping shim of the present invention positioned in the fuel assembly.

FIG. 2 is a cross-sectional view of the fuel assembly and the one shipping shim 30 shown in FIG. 1. Although only one shipping shim is shown in FIGS. 1 and 2 for purposes of illustration and discussion, virtually any number of shims can be used with each fuel assembly. Although the present invention is described in relation to the fuel assembly shown in FIG. 1, it will be readily understood by those skilled in the art that the present invention can be used with any type of nuclear fuel assembly, not just BWR fuel assemblies, or the BWR fuel assembly shown in FIG. 1.

Figure 3:
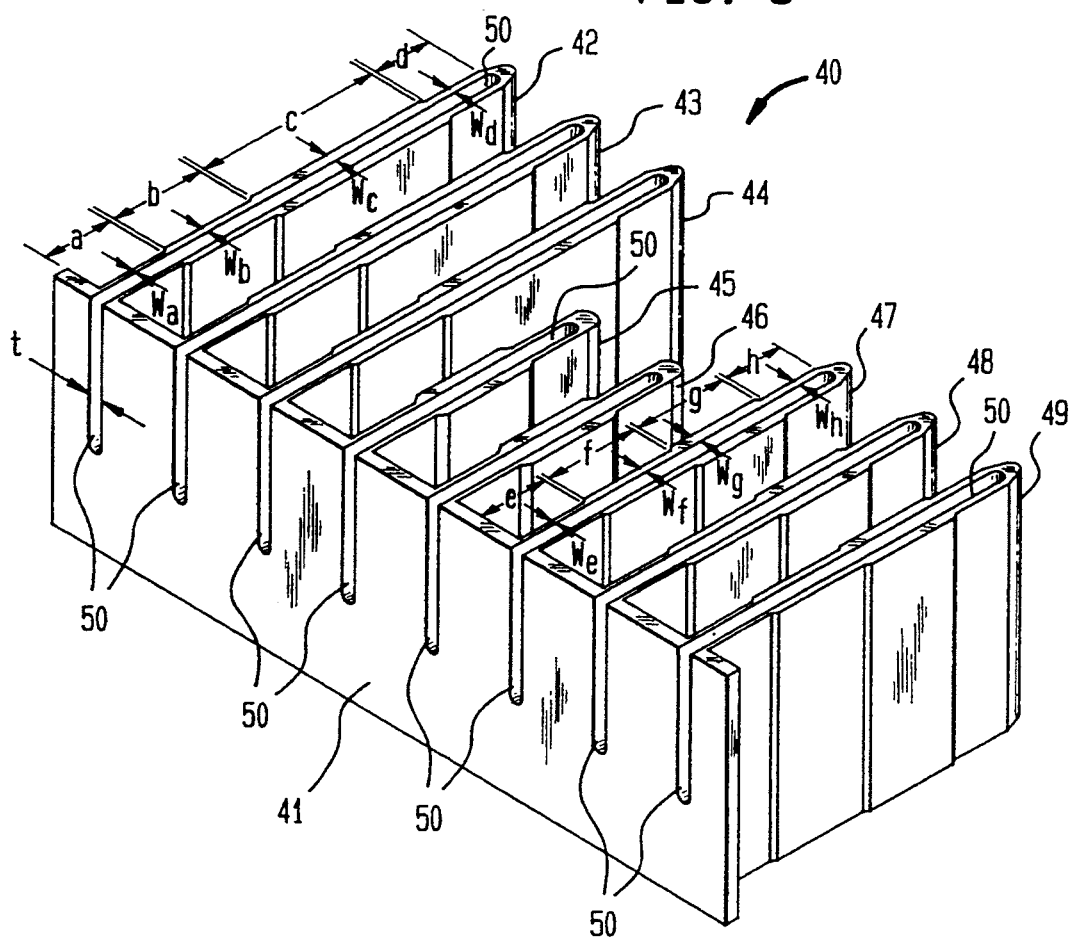
FIG. 3 is an isometric view of the main fork of the shipping shim shown in FIG. 2.
Figure 4:
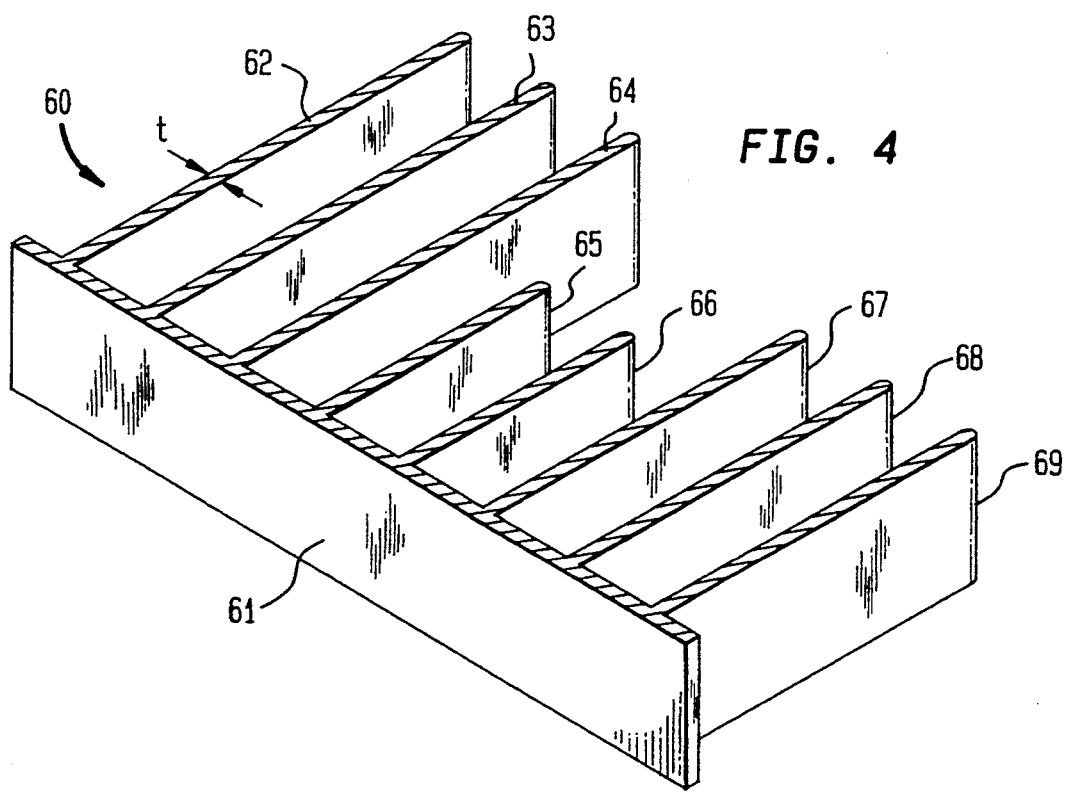
FIG. 4 is an isometric view showing the inner locking fork of the shipping shim shown in FIG. 2.

Shipping shim 30 comprises two fork members, main fork 40 and locking fork 60 and are shown in FIGS. 3 and 4, respectively.

Referring to FIG. 3, main fork 40 is shown in its unloaded position and comprises a plurality of slotted tines 42, 43, 44, 45, 46, 47, 48 and 49 each of which extend from base 41. Shipping shim 30 restrains fuel rods 11, 12 and 13 within the fuel assembly 10 with tines 42-49. Each of tines 42-49 has a slotted portion 50 which, with the exception of its distal end extends the length of the tine and through the wall of base 41.

Locking fork 60 shown in FIG. 4 comprises ribs 62, 63, 64, 65, 66, 67, 68 and 69 which extend from web 61. Ribs 62-69 are shown having uniform thickness t which corresponds to the width of the slots 50 in hollow tines 42-49 and base 41.

During preparation of the fuel assembly for shipping, main fork 40 is slipped into the assembly at one or more locations, preferably adjacent a spacer grid. For each main fork, a locking fork 60 is then installed by inserting each of ribs 62-69 into the corresponding slots 50 of each of corresponding tines 42-49. Once locking fork 60 is completely installed in main fork 40, the shim is effectively locked in place by frictional forces and establishes a rigid mass of material between the fuel rods, and the fuel rods and non-fueled components, as shown in FIG. 2. For the fuel assembly shown in FIG. 2, only one shipping shim 30 is shown; however, identical pairs of main and locking forks 40 and 60 would be inverted for installation from the opposite side of the fuel assembly. This provides restraint for each fuel rod of the fuel assembly at one axial height of the assembly.

Until each of the ribs of locking fork 60 are installed within slots 50 of main fork 40, tines 42-49 of main fork 40 are flexible, spring-like and resilient which enables them to pass through the various gaps between the fuel rods, and between the fuel rods and nonfuel bearing members which will be secured once the locking fork is installed.

The thickness of the walls of tines 42-49 vary along their length, as shown for example in FIG. 3. Tine 42 has a wall thickness of $w_a$ along span a, wall thickness $w_b$ along span b, wall thickness $w_c$ along span c, and wall width $w_d$ along span d. Ribs 62-69 of fork 60 are inserted into slots 50 of tines 42-49. Once the ribs are completely inserted into the tines, the shim is in its locked position as shown in FIG. 2.

The thicknesses $w_a$, $w_b$, $w_c$ and $w_d$ are selected together with thickness t so that the overall width of each rib and each tine as a function of their length correspond to the respective gaps between fuel rods 11, 12, 13 which are adjacent to one another as well as to the gaps between fuel rods 11, 12 or 13 and the outer wall of inner channel 20. Examples of such gaps are shown in FIG. 2 as gaps $g_1$, $g_2$, $g_3$ and $g_4$. Thus, for example, for the fuel rods positioned on each side of tine 42 along span a, the gap between two adjacent fuel rods 11 would be accommodated by the overall width comprised of the widths $w_a+w_a+t$. Similarly, for the fuel rods 12 and 13 which will be positioned along each side of span c of tine 42, the gap between these fuel rods is accommodated by the overall width comprised of widths $w_c+w_c+t$. And, the gap between fuel rod 12 positioned along tine 47 and the center water channel 20 is accommodated by the overall width comprised of the widths $w_h+w_h+t$. Thus, the exterior contour of the tines together with thickness t of the ribs permit the shim 30 to have the thickness necessary to accommodate and fill particular gaps of varying size throughout the fuel assembly.

Although the main fork 40 and locking fork 60 can be made of substantially any material, it is preferred that both the main fork 40 and locking fork 60 would ordinarily be injection molded from a fairly soft plastic material, such as low density polyethylene. Since the preferred material of construction of each of the forks 40 and 60 is softer than zircaloy, the material presently used for fuel rod cladding in most fuel assemblies, any rubbing or fretting will result in the wear of the shim, and not the fuel rod cladding.

The length of the tines and the angle they make with the base and/or web (41, 61) depends upon the size and geometry of the fuel rod array within the particularly fuel assembly. In the assembly shown in FIG. 2, one shim 30 cannot be used alone to secure the fuel rods along one axial position because central water channel 20 limits the length or span of some of the tines.

Although the shipping shim 30 is shown having tines and ribs substantially orthogonal to the base and web (41 and 61), depending upon the fuel rod configuration, the tines and ribs could be at some other angle to the base and web. Furthermore, although tines 42-49 are shown as generally rectangular in shape in FIG. 3, the surface area of the tines need not be flat, but may be contoured to match the shape of the fuel rod(s) and/or the non-fuel bearing members.

While the present invention has been particularly shown and described with reference to preferred embodiments thereof, it will be understood by those skilled in the art that various changes in form and details may be made therein without departing from the spirit and scope of the invention.

I claim:

1. A shipping shim for restraining substantially parallel fuel rods in a nuclear fuel assembly, comprising:
   (a) a main fork having a plurality of flexible and substantially parallel tines for insertion between the substantially parallel fuel rods in the nuclear fuel assembly, the plurality of tines extending from a base, at least one of the plurality of tines being adapted to have a hollow portion which hollow portion extends into the base;
   (b) a locking fork having at least one rib for insertion into the at least one hollow tine, the at least one rib extending from a web and being adapted to fit into the hollow portion of the base and the at least one of the plurality of tines of the main fork, so that when the at least one rib is inserted into the at least one hollow tine, the at least one hollow tine becomes substantially rigid restraining at least two substantially parallel fuel rods.

2. A shipping shim for restraining substantially parallel nuclear fuel rods in a nuclear fuel assembly having non-fuel bearing members as well as nuclear fuel rods, the shipping shim comprising:
   (a) a main fork having a plurality of flexible and substantially parallel tines for insertion between ones of said nuclear fuel rods and non-fuel bearing members in the nuclear fuel assembly, the plurality of tines extending from a base, at least one of the plurality of tines being adapted to have a hollow portion which hollow portion extends into the base;
   (b) a locking fork having at least one rib for insertion into the at least one hollow tine, the at least one rib extending from a web and being adapted to fit into the hollow portion of the base and the at least one of the plurality of tines of the main fork, so that when the at least one rib is inserted into the at least one hollow tine, the at least one hollow tine and the inserted at least one rib becomes substantially rigid restraining ones of said nuclear fuel rods and non-fuel bearing members.

3. A shipping shim as in claim 2 wherein the at least one of the plurality of tines is a plurality of hollow tines being adapted to have a corresponding hollow portion, and the at least one rib is a plurality of ribs being adapted to fit into corresponding ones of the plurality of hollow tines.

4. A shipping shim as in claim 3 wherein the at least one of the plurality of hollow tines has at least one wall of varying thickness.

5. A shipping shim as in claim 4 wherein the tines of the main fork are substantially orthogonal to the base, and the ribs of the locking fork are substantially orthogonal to the web.

6. A shipping shim as in claim 5 wherein the main fork is made of a plastic material.

7. A shipping shim as in claim 6 wherein the plastic material is polyethylene.

8. A shipping shim as in claim 7 wherein the locking fork is made of a plastic material.

9. A shipping shim as in claim 8 wherein the plastic material is polyethylene.

10. A fuel assembly for a nuclear reactor comprising:
    (a) an upper tie plate;
    (b) a lower tie plate;
    (c) a plurality of spaced apart fuel rods retained at their ends between the upper tie plate and the lower tie plate;
    (d) a plurality of spacer grids mounted along the length of said fuel assembly and spaced from one another, for positioning said plurality of fuel rods in a predetermined configuration;
    (e) means for permitting coolant moderator to flow from said lower tie plate through said fuel assembly and out of said upper tie plate; and
    (f) a shipping shim for restraining the spaced apart fuel rods, the shipping shim comprising:
      (1) a main fork having a plurality of flexible and substantially tines for inserted between ones of said nuclear fuel rods and means for permitting coolant moderator to flow from said lower tie plate through said fuel assembly and out of said upper tie plate, the plurality of tines extending from a base, at least one of the plurality of tines being adapted to have a hollow portion which hollow portion extends into the base;
      (2) a locking fork having at least one rib inserted into the at least one hollow tine, the at least one rib extending from a web and being adapted to fit into the hollow portion of the base and the at least one of the plurality of tines of the main fork, so that when the at least one rib is inserted into the at least one hollow tine, the at least one hollow tine and the inserted at least one rib becomes substantially rigid restraining ones of said nuclear fuel rods and means for permitting coolant moderator flow.

* * * * *